United States Patent [19]

Silverbrook

[11] Patent Number: 5,428,724
[45] Date of Patent: Jun. 27, 1995

[54] METHOD AND APPARATUS FOR PROVIDING TRANSPARENCY IN AN OBJECT BASED RASTERIZED IMAGE

[75] Inventor: Kia Silverbrook, Woollahra, Australia

[73] Assignees: Canon Information Systems, Tokyo, Japan; CanonKabushiki Kaisha & Research Australia Pty Limited, New South Wales, Australia

[21] Appl. No.: 53,214

[22] Filed: Apr. 28, 1993

[30] Foreign Application Priority Data

Apr. 29, 1992 [AU] Australia .................... PL2153

[51] Int. Cl.[6] .................................................. G06F 15/62
[52] U.S. Cl. ......................................................... 395/135
[58] Field of Search ............. 395/133, 135, 155, 161; 345/22, 23, 24, 113, 114

[56] References Cited

U.S. PATENT DOCUMENTS 5,303,334  4/1994  Snyder et al. .................... 395/109

Primary Examiner—Phu K. Nguyen
Attorney, Agent, or Firm—Fitzpatrick, Cella, Harper & Scinto

[57] ABSTRACT

A system for adding transparency to an object based rasterized image includes comparing edge information with a pixel position on a scan line in order to determine the active objects on the scan line based on level information and determining a highest active opaque object level and a highest active transparent object level. According to the present invention, whenever the highest active opaque object level and the highest active transparent object level intersect at one pixel location, the higher of the two levels is output.

24 Claims, 3 Drawing Sheets

METHOD AND APPARATUS FOR PROVIDING TRANSPARENCY IN AN OBJECT BASED RASTERIZED IMAGE

BACKGROUND

1. Field of the Invention

The present invention relates to object based graphic systems and, in particular, discloses a method and apparatus for providing transparency in an object based rasterized image prior to displaying that image on either a video display or by means of printing.

2. Description of the Related Art

Most object based graphics systems utilise a frame store to hold a pixel based image of the page or screen. The outlines of the objects are calculated, filled and written into the frame store. For two-dimensional graphics, objects which appear in front of other objects are simply written into the frame store after the background object, thereby replacing the background on a pixel-by-pixel basis. This is commonly known in the art as "Painter's algorithm". Images are calculated in object order, from the rearmost object to the foremost object. However, real time image generation for raster displays can be efficiently achieved by calculating the images in raster order. This means that each scan-line must be calculated as it is reached. This requires that the intersection points of each scan line with each object outline are calculated and subsequently filled.

Although it is possible, with a line buffer rather than a page buffer, to use the Painter's algorithm within a scan-line to fill the objects, such an approach requires multiple writing of pixels at high speed to achieve real-time operation.

Furthermore, it is generally required to provide the visual effect of "transparency" in which some objects are rendered (displayed) in a transparent fashion (e.g. an object visible but in shadow, or a distant object viewed through a window). This is generally achieved using "Painter's algorithm" by averaging the colours of the objects that overlap to form the transparent portion of the image.

SUMMARY OF THE INVENTION

It is the object of the present invention to substantially overcome the need for a frame store through provision firstly of a means by which overlying objects in an image can be filled on a line-by-line base and a means by which transparency can be effected in an object based rasterized image.

In accordance with one aspect of the present invention there is disclosed a method for adding transparency to an object based rasterized image, said method comprising the steps of:

(a) comparing a pixel position in a raster line with pixel edge intersection data of a plurality of different objects to determine if an edge exists at said pixel position;

(b) if not, moving to the next pixel position whilst maintaining a currently displayed pixel fill level;

(c) if so, fill level data is selected for each possible one of said objects able to be represented by said pixel, and compared with a transparency input to determine if transparency is required for the topmost object;

(d) if no transparency is required, the highest priority fill level data is displayed as the current pixel fill level; and (e) if transparency is required, the active fill level directly below the transparent level is selected and an alternative colour palette applied to said fill level to alter the displayed colour to provide transparency for the object beginning at that edge.

According to another aspect of the present invention, there is disclosed a method for adding transparency to an object based rasterized image composed of a plurality of objects including edge information, level information and transparency information, said method comprising the steps of:

(a) receiving edge intersection data for those objects that intersect a current raster line of the image and determining which corresponding objects are active at a current pixel position, (b) determining the highest active opaque object level for all the currently active objects, (c) determining the highest active transparent object level for all the currently active objects, (d) outputting object level information corresponding to the highest active opaque object level, and (e) simultaneously outputting transparency information corresponding to the transparency information of the higher of the highest active opaque object level and the highest active transparent object level.

In accordance with another aspect of the present invention there is provided an apparatus for adding transparency to an object based rasterized image, said apparatus comprising:

edge reception means adapted to receive pixel edge intersection data of a plurality of different objects and to determine from said pixel edge intersection data which of said objects are active at a current pixel position and a transparency value and a level value of each of said active objects;

opaque object level selection means connected to edge reception means and adapted to determine the active object with the highest opaque level value;

transparency determination means connected to said edge reception means and adapted to determine the transparency value of the highest active object; and output means connected to said opaque object level selection means and said transparency determination means and adapted to output said highest opaque level value with the transparency value of the highest active object.

BRIEF DESCRIPTION OF THE DRAWINGS

A preferred embodiment; of the present invention will now be described with reference to the drawings in which.

DETAILED DESCRIPTION OF THE PREFERRED EMBODIMENT

Figure 1:
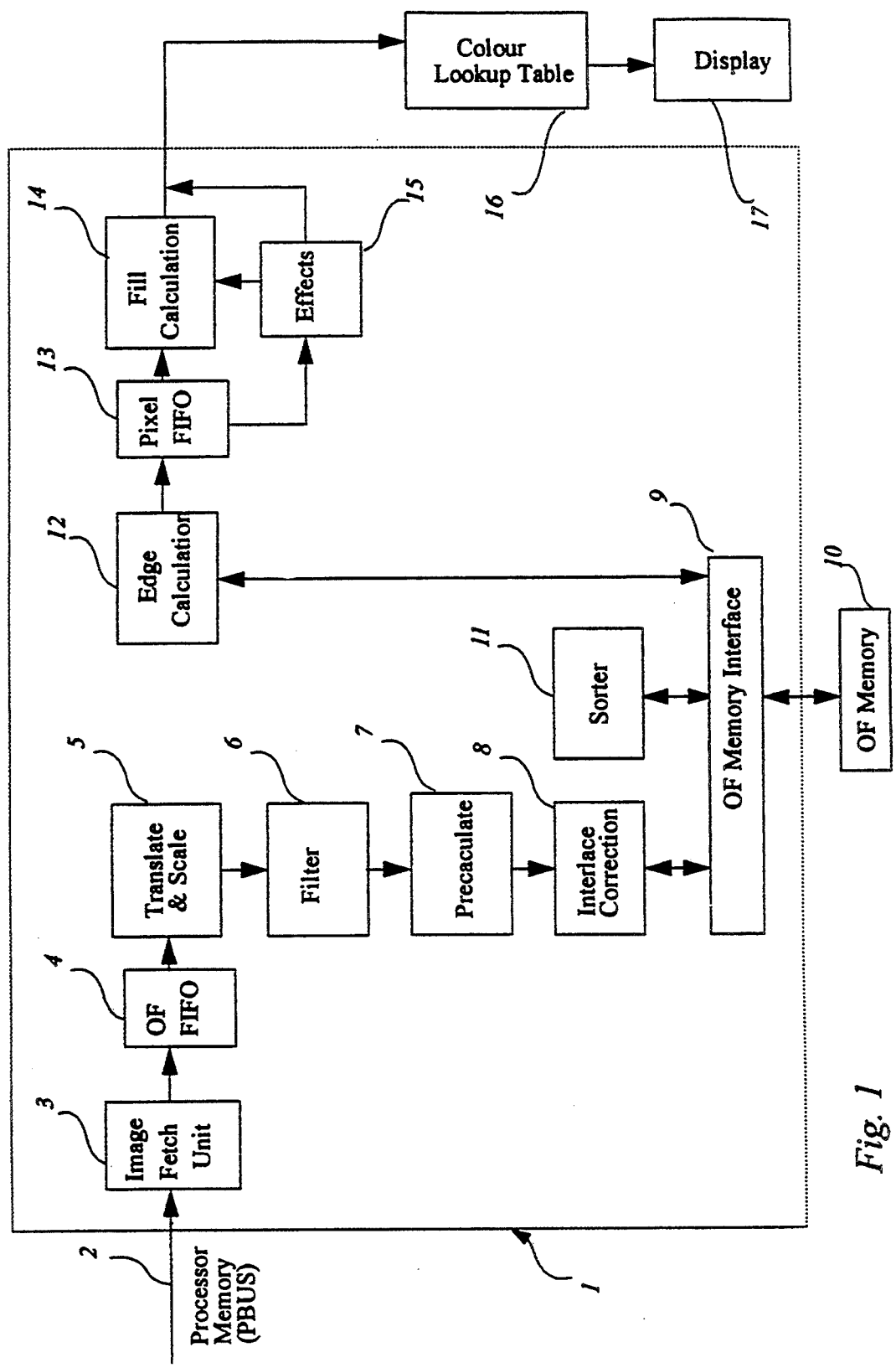
FIG. 1 is a data flow block diagram representation of a real-time object processor in which the present invention is useful.

As seen in FIG. 1, a real-time object (RTO) processor 1 is shown which is the subject of U.S. patent application Ser. No. 08/053,212, filed Apr. 28, 1993, entitled "A Real-Time Object Based Graphics System", the disclosure of which is hereby incorporated by reference. The RTO processor 1 is configured to manipulate object based image data in a rasterised format so as to generate images in real-time without the use of an image flamestore, and for display on either a video display or using a printer.

Object based graphics information is generated by a controlling host processor (not illustrated) as an object list for the image and is input to the RTO processor 1 via a processor memory input 2. An image fetch unit 3 provides an interface with the host processor and an OF FIFO (object fragment first-in first-out register) 4 decouples object data from the host processor memory. The processor 1 then preprocesses the object fragments (individual portions of graphic objects) in a number of stages such as translation and scaling 5, filtering 6, precalculation 7 and interlace correction 8. The preprocessed object fragments are then stored in an OF memory 10 via an interface 9. A sorter 11 is provided which reformats the object fragments in the memory 10 into a specific order corresponding to a raster format of the image to be produced.

In this manner, the object fragments can be read from the memory 10 by an edge calculator 12 which outputs edge pixel position data for each scan line of the rasterised image corresponding to edge intersections of objects which form the image. The pixel edge data is buffered using a pixel FIFO 13 prior to being input to a fill calculator 14 and effects unit 15, which operate in synchronisation with the display (not illustrated). Output from the fill calculator 14 and the effects unit 15 is colour level data which can be decoded using a colour look-up table 16 for display on a pixel-by-pixel basis on a display device 17. The present invention is specifically concerned with the fill calculation 14 and the operation of the effects unit 15 to form transparencies in the image.

Figure 2:
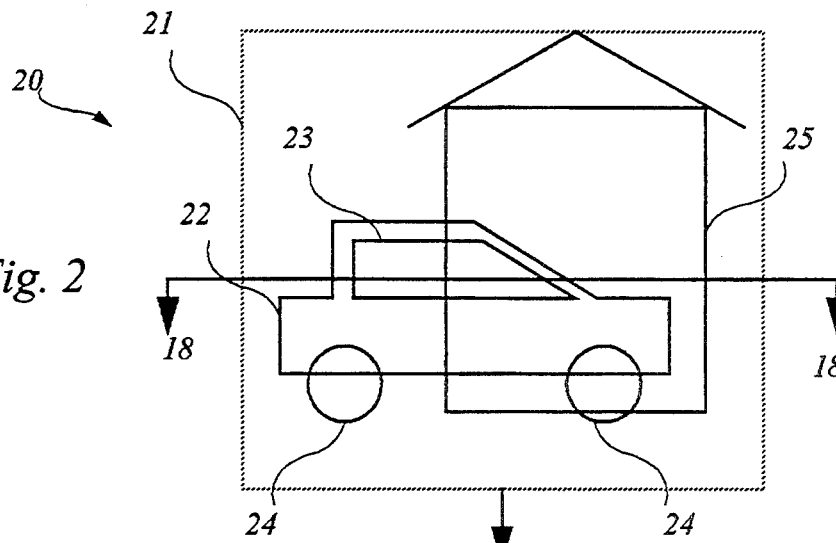
FIGS. 2 to 6 illustrate the various steps of filling a rasterised image with transparent data.

Referring now to FIG. 2, the object outlines of an image 20 are shown. In this example, the image 20 is formed by a background object 21, a car body object 22, a car window object 23, two car wheel objects 24, and a building object 25. The objects 21–25 of the image 20 show only outline information which is used to form the resulted image.

Figure 3:
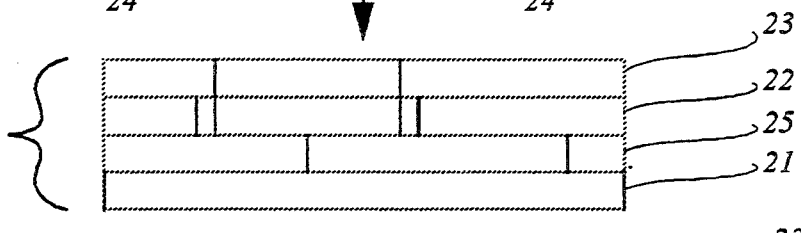
Figure 4:
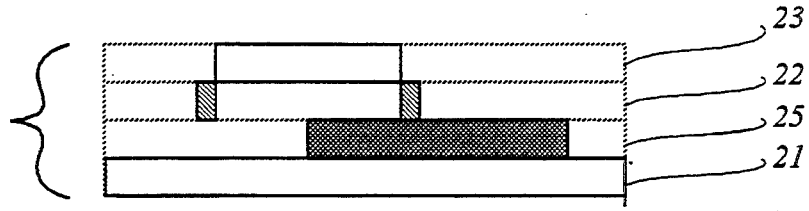
Figure 5:
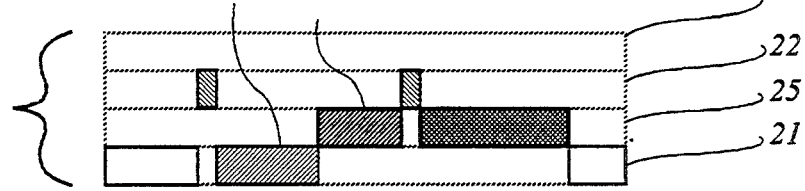

FIGS. 3, 4 and 5 represent object priority levels through a single scan line 18 of the image seen in FIG. 2. As seen in FIG. 3, the edge intersections for each of the objects which appear on the scan line 18 are shown. In this particular example, the car window object 23 has the highest priority level followed by the car body 22, the building 25 and finally the background 21. In this manner, the car body 22 in the resultant image is therefore seen to be located in the foreground of the building 25. The object edges indicated in FIG. 3 are those edges calculated by the edge calculator 12 as seen in FIG. 1. Accordingly, as the image display scans that particular scan line, the edges met at relevant pixel locations define the colour of the resultant image for all pixels following up until the next edge intersection. This permits filling of the image which is seen in FIG. 4.

As seen in FIG. 4, associated with each of the objects on the scan line 18 is a specific colour. Because, as seen in FIG. 4, various colours are asserted at corresponding times, it is necessary to remove from the pixel data stream those colours which are of a lower priority in the image when viewed. This is called hidden surface removal and is performed by the fill calculator 14 as seen in FIG. 1. A specific embodiment of the ill.1 calculator 14 is seen in U.S. patent application Ser. No. 08/053,212, filed Apr. 28, 1993, entitled "Method and Apparatus for Filling an Object Based Rasterised Image", and the disclosure of which is hereby incorporated by reference. The hidden surface removal results in a pixel data stream essentially corresponding to that shown in FIG. 5 which, as one traverses the scan line 18 from left to right, commences with the background image 21, a small portion of the car body 22, the window 23, the car body 22 again, the building 25 and finally the background 21 again.

However, in this particular embodiment, from FIG. 4 it is seen that the window object 23 has no particular colour and instead causes modified colours of the layers 21 and 25 directly below the window 23 to be asserted. These modified colours 27 and 28 are generated by a colour look-up table which is addressed by both the layer information and the transparency information.

Figure 6:
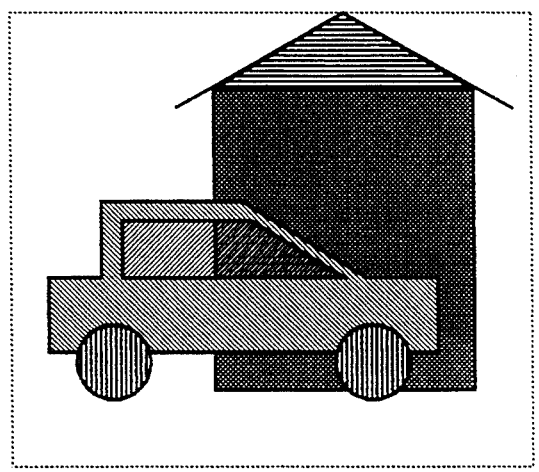

This is because, by considering the resultant image seen in FIG. 6, when the image 20 is viewed through the window 23, what is seen is both the background 21 and the building 25, although each of those objects is of a slightly different colour as a result of the shading effect when seen through the window 23. Such a result is achieved using the effects unit 15 as seen in FIG. 1 which works in concert with the fill calculator 14 to detect transparency data with pixel information. In the particular example of FIGS. 2 to 6, only the window 23 has transparency asserted which permits the object intersection between the window 23 and building 25 to result in a change in the resultant image seen in FIG. 6 in spite of that object edge transition having a lower priority level as seen in FIGS. 3 and 4.

Figure 7:
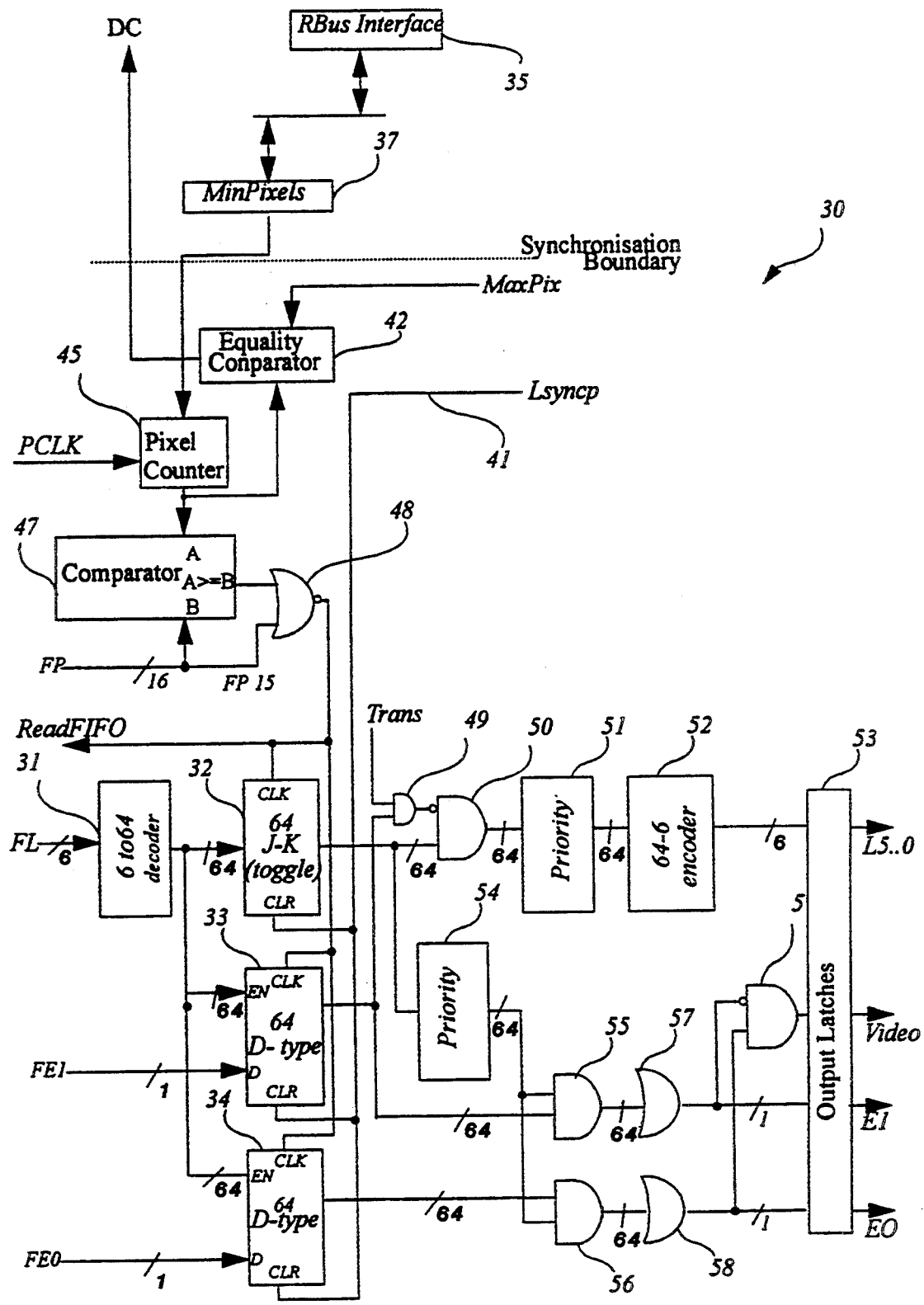
FIG. 7 is a schematic block diagram representation of the preferred embodiment of a fill and effects unit which implements transparency.

FIG. 7 shows a preferred embodiment of a fill and effects unit (FEU) 30 which performs the combined functions of the fill calculator 14 and effect unit 15 of FIG. 1. The FEU 30 takes level and effects information for each of the object edges in the pixel FIFO 13 of FIG. 1, and combines them to derive the correct display level and effects for the current pixel. This is done using single bit registers for each of 64 levels of colour data, representing the display state (ON or OFF) for that level at the current pixel position.

The pixel FIFO 13 outputs 16 bits of pixel data FP which represents the pixel position in a particular scan line, 6 bits of level data FL which represents the priority (colour) level of the pixel data, and two bits of effects data FE 1, FE0 which permit a particular transparency level to be selected. The level data (FL) is decoded using a 6 to 64 decoder 31 which outputs to three banks of flip-flops comprising a bank of 64 JK flip-flops 32 connected as toggle latches, a bank of 64 D-type flip-flops 33, and a second bank of 64 D-type flip-flops 34. The decoded level data FL is input to the enable input of the flip-flops 32, 33 and 34 and the effects data FE1 and FE0 is input to the D input of each of the flip-flops 33 and 34.

A bus interface 35 is provided which connects the FEU 30 with a register bus (not illustrated) of the processor 1. The interface 35 connects with a register 37 for the minimum pixel number on a line, (MINPIXELS). The interface 35 and the register 37 operate in synchronization with the bulk of the processor 1, whereas the larger portion of the FEU 30 operates in synchronization with the display to which the processor 1 outputs. Accordingly, a synchronization boundary 40 separates these two portions. A line synchronization signal LSYNCP 41 interconnects with the display and acts to clear each of the flip-flops 32, 33 and 34, which act as display registers, at the commencement of each scan line. This has the effect of clearing all values within the FEU 30 prior to information being read out of the pixel FIFO 13.

The MINPIXEL register 37 value is loaded into a pixel counter 45 which is incremented by a pixel clock PCLK also synchronised with the display. The pixel counter 45 thereby outputs the current pixel position in the scan line being displayed which is output to a comparator 47, and an equality comparator 42. The equality comparator 42 is also input with a number MAXPIX representing the maximum number of pixels and asserts an output DC when the pixel count reaches MAXPIX.

The pixel data FP is input to the comparator 47 which determines if the pixel position in the line is greater than or equal to the pixel value. If so, the output of the comparator 47 is enabled which is input to a NOR gate 48, also input with the most significant bit (FP15) of the pixel data FP. The NOR gate 48 outputs to the clock inputs of each of the flip-flops 32, 33 and 34 as well as asserting the next read of the pixel FIFO 13 by enabling an output READFIFO.

In the processor 1, object fragments are arranged to arrive at the front of the pixel FIFO 13 in ascending pixel order. Any object fragments with negative pixel values are clocked out of the FIFO 13 as soon as they reach the front of the FIFO 13 by reason of the connection of the most significant bit (FP15) to the NOR gate 48. Other object fragments are clocked out when the pixel counter 45 is greater than or equal to the pixel value FP and the READFIFO asserted. When an object fragment is clocked out of the FIFO 13, the display register for that object fragment's level (one of the flip-flops 32) is toggled, while the effects bits are latched into the effects registers (the flip-flops 33 and 34) corresponding to that particular level.

The FEU 30 outputs a display level (L5 . . . L0) from an output latch 53 in which the output level (L5 . . . L0) is determined as follows. The FEU 30 includes a transparency input TRANS which is used by the RTO processor 1 to enable the displaying of transparent objects. If the TRANS input is not enabled, FE1 and FE0 do not effect the level (L5 . . . L0) and the circuit operates according to U.S. patent Application Ser. No. 08/053,212, entitled "Method and Apparatus for Filling an Object Based Rasterised Image".

If TRANS is enabled, through the operation of 64 AND gates 49 and an array of 64 AND gates 50, the 64 display bits in the flip-flops 32 are each gated 50 with the corresponding first effects bits, derived from FE1, output from the flip-flops 33. The output of the flip-flops 33 overrides any corresponding output from the flip-flops 32 such that only outputs of the AND gates 50 for which an active non-transparent layer exists are asserted. Accordingly, a priority level retained in a priority latch 51 will indicate the highest active non-transparent level. This 64-level information is converted to the 6-bit output level (L5 . . . L0) provided by encoder 52. The effects bits corresponding to the highest display level (regardless of transparency) are output on the (E1 and E0) outputs and these effects bits are used to select modified colours in the colour look-up table 16. Accordingly, modified versions of the colours of the active layers below the transparent layer are displayed.

If TRANS is not enabled, the gating of the AND gates 49 and 50 has no effect. The highest display bit remaining after the transparent layers has been removed is then encoded and output on the (L5 . . . L0) outputs. In addition, a VIDEO output is asserted via an AND gate 59 if the first effect bit FE1 is cleared and if the second effects FE0 is set.

The effects outputs E0 and E1 are simply the latched effects bits FE0 and FE1 corresponding to the highest level where time display bit is set. This is derived from the flip-flops 32 and is selected by passing the output of the flip-flops 32 through a priority selector 54 which chooses the highest active level by means of the AND-OR selectors 55–57 and 56–58.

It is apparent from the foregoing that the output latches 53 provide an 8-bit address comprised of 6 bits of level output (L5 . . . L0) and 2 effects bits (FE1, FE2). The level output selects a colour level residing at an address in a palette of 64 colours. The effects bits permit the selection off our different palettes. Accordingly, this permits the selection of 256 colours.

In the system of U.S. patent application Ser. No. 08/053,373, the colour look-up table 16 also connects to the host processor bus. Because the host processor, having formed the object list for the image, knows which objects are present in the image, the host processor can thereby vary those four colour palettes able to be used by the colour look-up table 16 for each line of the image. This configuration permits the RTO processor 1 to load the colour look-up table with the 256 colours which can appear in the image. In a typical example, these 256 colours are selected from 24-bit colour data in RGB or YUV format to support over 16 million different colours.

With reference to FIGS. 2 to 6, the circuit of FIG. 7 has the effect, when determining the fill level for the scan line 18 when the car window object 23 is encountered, of selecting a palette of colours different to that palette which includes the colours of the background 21, the car chassis 22, and the building 25. This different palette is configured to provide a similar colour level transition, but at a different overall intensity so as to provide the shading effect of the background 21 and the building 25 when viewed through the window 23.

This is achieved through the level output (L5 . . . L0) displaying the level below the transparent object and the effects output E1 being asserted to select an alternate palette of 64 colours from the colour look-up table 16.

Furthermore, in the system of U.S. patent application Ser. No. 08/053,373, object data is processed in the form of quadratic polynomial fragments, which have a simpler mathematical representation than their (Bezier) cubic spline counterparts and therefore, at the time of drafting this document, can be processed at a higher rate, thereby permitting real-time operation. However, the present invention is applicable to all object based, as opposed to pixel based, data formats, and can be applied to spline formats.

The foregoing describes only one embodiment of the present invention and modifications, obvious to those skilled in the art can be made thereto without departing from the scope of the present invention.

We claim:

1. A method for adding transparency to an object based rasterized image composed of a plurality of objects including edge information, level information and transparency information, said method comprising the steps of:
  (a) receiving edge intersection data for each of the plurality of objects that intersect a current raster line of the image and determining which corresponding objects are active at a current pixel position;
  (b) determining a highest active opaque object level for all the currently active objects;
  (c) determining a highest active transparent object level for all the currently active objects;
  (d) outputting object level information corresponding to the highest active opaque object level; and
  (e) simultaneously outputting transparency information corresponding to the currently active object having a higher level of the highest active opaque object level and the highest active transparent object level.

2. A method as claimed in claim 1, wherein the receiving step further comprises storing indication of currently active objects.

3. A method as claimed in claim 2, wherein the receiving step further comprises using said edge intersection data to alter the stored indications of currently active objects.

4. A method as claimed in claim 2, wherein the receiving step further comprises storing transparency information of each currently active object.

5. A method as claimed in claim 4, wherein the determining step further comprises using said edge intersection data to alter the stored transparency information of currently active objects.

6. A method as claimed in claim 2, wherein the simultaneous outputting step further comprises using said output transparency information to select a colour palette.

7. A method as claimed in claim 6, wherein the outputting step further comprises using said object level information output to select a colour within said colour palette.

8. A method as claimed in claim 1, wherein the step of simultaneously outputting further comprises deriving a video active signal from said output transparency information.

9. A method as claimed in claim 1, wherein said method is applied to an interlaced display.

10. A method for adding transparency to an object based rasterized image, said method comprising the steps of:
  (a) comparing a pixel position in a raster line with pixel edge intersection data of a plurality of different objects to determine if an edge exists at said pixel position;
  (b) in the case no edge exists at the pixel position, moving to the next pixel position while maintaining a currently displayed pixel fill level;
  (c) in the case an edge exists at the pixel position, fill level data is selected for each possible one of said objects able to be represented by said pixel, and compared with a transparency input to determine if transparency is required for the topmost object;
  (d) if no transparency is required, the highest priority fill level data is displayed as the current pixel level; and
  (e) if transparency is required, the active fill level directly below the transparent level is selected and an alternative colour palette applied to said fill level to alter the displayed colour to provide transparency for the object beginning at the pixel position.

11. A method as claimed in claim 10, wherein said objects include object colour and effects information.

12. A method as claimed in claim 10, wherein a step of buffering the pixel edge intersection data of said plurality of different objects precedes the step of comparing a pixel position.

13. A method as claimed in claim 10, wherein said objects include edge information and wherein a step of sorting object edge information by the pixel edge intersection data of a current line which is to be obtained precedes the step of comparing pixel positions.

14. A method as claimed in claim 1 or 10 wherein said objects are described by quadratic polynomial fragments.

15. Apparatus for adding transparency to an object based rasterized image, said apparatus comprising:
  edge reception means for receiving pixel intersection data of a plurality of different objects and to determine from said pixel edge intersection data which of said objects are active at a current pixel position, and transparency value, and a level value of each of said active objects;
  opaque object level selection means, connected to edge reception means, for determining the active object with the highest opaque level value;
  transparency determination means, connected to said edge reception means, for determining the transparency value of the highest active object; and
  output means, connected to said opaque object level selection means and said transparency determination means, for outputting said highest opaque level value with the transparency value of the highest active object.

16. Apparatus as claimed in claim 15, wherein said edge reception means includes a plurality of object state storage means which are in an active state when an object is active at a current pixel position, and are in a non-active state when said object is in a non-active state at a current pixel position.

17. Apparatus as claimed in claim 16, wherein said edge reception means includes a plurality of transparency effect storage means adapted to store said transparency value of each active object.

18. Apparatus as claimed in claim 16, wherein said opaque object level selection means is connected to said plurality of object state storage means.

19. Apparatus as claimed in claim 17, wherein said transparency determination means is connected to said plurality of transparency effect storage means.

20. Apparatus as claimed in claim 15 wherein said transparency value is used to select one of a plurality of colour palettes and said opaque level value is used to select a display colour from said palette 21. Apparatus as claimed in claim 15 including video determination means connected to said output means and adapted to determine a video output signal.

22. Apparatus as claimed in claim 15 wherein said apparatus includes a transparency enablement input signal such that when said transparency enablement input signal is activated, said output means outputs the transparency of the highest active object and when said transparency enablement input signal is not activated, said output means outputs the transparency value of the highest active opaque object.

23. Apparatus as claimed in claim 15 wherein said objects are described by quadratic polynomial fragments.

24. A method for generating a rasterized image which includes a transparency part, said method comprising the steps of:
- (a) determining whether an edge exists on a pixel position in a raster line or not;
- (b) in the case that no edge exists at the pixel position, generating a predetermined level of image data so as to maintain a currently rasterized pixel level;
- (c) in the case that an edge exists at the pixel position, determining if a transparency is required for an upper object;
- (d) if no transparency is required, a highest priority fill level data is rasterized as the current pixel level; and
- (e) if a transparency is required, an active fill level below a transparent level is selected and modified to provide a transparency for the object beginning at the edge.

* * * * *

UNITED STATES PATENT AND TRADEMARK OFFICE
CERTIFICATE OF CORRECTION

PATENT NO. : 5,428,724

DATED : June 27, 1995

INVENTOR : Kia Silverbrook

It is certified that error appears in the above-identified patent and that said Letters Patent is hereby corrected as shown below:

ON THE COVER

Under [73] Assignees, "Canon Information Systems, Tokyo, Japan; CanonKabushiki Kaisha & Research Australia Pty Limited, New South Wales, Australia" should read --Canon Kabushiki Kaisha, Tokyo, Japan; Canon Information Systems Research Australia Pty Limited, New South Wales, Australia--.

COLUMN 3

Line 1, "Ser. No. 08/053,212" should read --Ser. No. 08/053,373--.

COLUMN 4

Line 2, "ill.1" should read --fill--.

COLUMN 6

Line 20, "off our" should read --of four--.

Signed and Sealed this

Third Day of October, 1995

Attest:

BRUCE LEHMAN

Attesting Officer

Commissioner of Patents and Trademarks